United States Patent
Wang et al.

(10) Patent No.: US 7,415,701 B2
(45) Date of Patent: Aug. 19, 2008

(54) METHODS AND APPARATUS TO SUPPORT MIXED-MODE EXECUTION WITHIN A SINGLE INSTRUCTION SET ARCHITECTURE PROCESS OF A VIRTUAL MACHINE

(75) Inventors: Yun Wang, Shanghai (CN); Miaobo Chen, Shanghai (CN); Eric Lin, Shanghai (CN); Chris Elford, Hillsboro, OR (US); Suresh Srinivas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 487 days.

(21) Appl. No.: 11/060,333

(22) Filed: Feb. 17, 2005

(65) Prior Publication Data

US 2006/0184920 A1  Aug. 17, 2006

(51) Int. Cl.
*G06F 9/44* (2006.01)
*G06F 7/38* (2006.01)

(52) U.S. Cl. .................. 717/127; 717/138; 717/148; 717/153; 712/227

(58) Field of Classification Search ......... 717/127–161; 712/227
See application file for complete search history.

(56) References Cited

U.S. PATENT DOCUMENTS

| | | | |
|---|---|---|---|
| 6,199,202 B1* | 3/2001 | Coutant et al. ............... | 717/138 |
| 6,282,702 B1* | 8/2001 | Ungar ........................ | 717/148 |
| 6,631,514 B1* | 10/2003 | Le .............................. | 717/137 |
| 2002/0059054 A1* | 5/2002 | Bade et al. .................... | 703/20 |
| 2003/0101334 A1* | 5/2003 | Desoli ......................... | 712/227 |
| 2003/0217087 A1* | 11/2003 | Chase et al. ................... | 709/1 |
| 2004/0031041 A1* | 2/2004 | Windheim et al. .......... | 719/321 |
| 2004/0133884 A1* | 7/2004 | Zemach et al. .............. | 717/138 |
| 2005/0049843 A1* | 3/2005 | Hewitt et al. .................. | 703/14 |
| 2005/0086650 A1* | 4/2005 | Yates et al. .................. | 717/139 |

OTHER PUBLICATIONS

Optimal code generation for embedded memory non-homogeneous register architectures, Araujo, G.; Malik, S.; System Synthesis, 1995., Proceedings of the Eighth International Symposium on, Sep. 13-15, 1995, IEEE, pp. 36-41.*

An ASIC RISC-based I/O processor for computer applications, Cates, R.L.; Farrell, J.J., III; Euro ASIC '90, May 29-Jun. 1, 1990, IEEE, pp. 50-55.*

DSP chips and total processing load of FFT analysis, Nasir, B.M., 1997, IEEE, pp. 6/1-6/5.*

(Continued)

*Primary Examiner*—Wei Y. Zhen
*Assistant Examiner*—Satish S Rampuria
(74) *Attorney, Agent, or Firm*—Hanley, Flight & Zimmerman, LLC

(57) ABSTRACT

Methods and apparatus to support the execution of a managed application that is linked to a native library or application are disclosed. The disclosed methods and apparatus support a virtual machine that is associated with the same ISA as the executing platform, while the ISA of the native library or application is of a different ISA. The disclosed methods and apparatus also support the execution of a managed application that is linked with several native libraries or applications that are associated with several different ISAs respectively.

12 Claims, 11 Drawing Sheets

OTHER PUBLICATIONS

PA-RISC to IA-64: transparent execution, no recompilation, Zheng, C.; Thompson, C., vol. 33 Issue: 3, 2000, IEEE, pp. 47-52.*

The Intel IA-64 compiler code generator, Bharadwaj, J.; Chen, W.Y.; Chuang, W.; Hoflehner, G.; Menezes, K.; Muthukumar, K.; Pierce, J., vol. 20 Issue: 5, 2000, IEEE, pp. 44-53.*

Grzegorz et al., *Automated and Portable Native Code Isolation*, Sun Microsystems, Palo Alto, California, Apr. 2001, 18 pages.

Hank Shiffman, *Boosting Java Performance: Native Code and JIT Compilers*, Silicon Graphics, Inc., Sep. 19996, 4 pages.

Regina Preciado, *What Managed Runtime Environments (MRTEs) Mean to You*, Intel® Developer Services, retrieved from the Internet on Dec. 13, 2004, URL: http://www.inte.com/cd/ids/developer/asmo-na/eng/43729.html, 7 pages.

Shawn Van Ness, *Copying, Cloning, and Marshalling in .NET*, O'Reilly Technology Conference, San Diego, California, Mar. 14-17, 2005, 6 pages.

Alan Zeichick, *WOWing Your 32-Bit Applications with 64-Bit Windows Part 1*, AMD64devSource, Mar. 8, 2004, 4 pages.

Native Code a Whatis.com definition, retrieved from the Internet on Dec. 16, 2004, URL: http://searchvb.techtarget.comsDefinition/0,,sid8_gci871064,00.html, 2 pages.

Kumar Shiv et al., *Java Opportunities and Challenges in a 64-bit World: Solutions with the Intel Itanium Processor Family and BEA WebLogic JRockit*, BEA Weblogic Bevelopers Showcase, Sep. 29, 2003, 6 pages.

*Porting Guide-Moving Java Applications to 64-bit Systems*, retrived from the Internet URL:http://www.ibm.com/developerworks/java/jdk/64bitporting/64BitJavaPortingGuide.pdf on May 13, 2005, 8 pages.

* cited by examiner

METHODS AND APPARATUS TO SUPPORT MIXED-MODE EXECUTION WITHIN A SINGLE INSTRUCTION SET ARCHITECTURE PROCESS OF A VIRTUAL MACHINE

TECHNICAL FIELD

The present disclosure relates generally to processor systems and, more particularly, to methods and apparatus to support mixed mode execution within a single instruction set architecture.

BACKGROUND

The need for increased software application portability (i.e., the ability to execute a given software application on a variety of platforms having different hardware, operating systems, etc.), as well as the need to reduce time to market for independent software vendors (ISVs), have resulted in increased development and usage of managed runtime environments and virtual machines.

Virtual machines (VMs) are typically implemented using a dynamic programming language such as, for example, Java™ and C#. A software engine (e.g., a Java Virtual Machine (JVM) and Microsoft®.NET Common Language Runtime (CLR), etc.), which is commonly referred to as a runtime environment, executes the dynamic program language instructions of the managed application. The VM interfaces dynamic program language instructions (e.g., a Java program or source code) to be executed to a target platform (i.e., the hardware and operating system(s) of the computer executing the dynamic program) so that the dynamic program can be executed in a platform independent manner.

Dynamic program language instructions (e.g., Java™ instructions) are not statically compiled and linked directly into native or machine code for execution by the target platform (i.e., the operating system and hardware of the target processing system or platform). Native code or machine code is code that is compiled down to methods or instructions that are specific to the operating system and/or processor. In contrast, dynamic program language instructions are statically compiled into an intermediate language (e.g., bytecodes), which may be interpreted or subsequently compiled by a just-in-time (JIT) compiler into native or machine code that can be executed by the target processing system or platform. Typically, the JIT compiler is provided by the VM that is hosted by the operating system of a target processing platform such as, for example, a computer system. Thus, the VM and, in particular, the JIT compiler, translates platform independent program instructions (e.g., Java™ bytecodes, Common Intermediate Language (CIL), etc.) into native code (i.e., machine code that can be executed by an underlying target processing system or platform).

VMs typically include interfaces (e.g., Java™ Native Interface (JNI)) to native libraries, which may be applications and/or libraries of procedures written in native programming languages (e.g., C, C++, assembly, etc.) that operate on or with the target platform. Interfacing with native libraries enables a managed application developer to call or utilize libraries that are already written, interface the managed application with hardware drivers written in native languages, and perform procedures that are not supported by the managed programming language.

A drawback to using native libraries from inside a VM is that the native libraries, unlike managed applications, are not platform-independent, unlike managed applications. Software applications written in native languages are linked directly into the native code of the platform on which they are compiled. In other words, the native libraries are not translated into the native instructions of the platform on which they are executing. Thus, the native libraries must be compiled for each ISA platform on which they are running. For example, a native library written in C and compiled on an Intel Pentium 4 processor (IA-32 instruction set architecture (ISA)) cannot be executed on an Intel Itanium processor family (IPF) ISA. Therefore, if a developer would like to move a managed application or VM from one processor platform to another, they must rewrite and/or recompile any native libraries that are required.

To enable the execution of managed applications that are linked to native libraries that are associated with ISAs different from the ISA of the operating platform, developers have created several strategies. One method utilizes one VM for each ISA with which native libraries are associated. For example, to execute a managed application linked to a 32-bit native library a 32-bit VM is used and to execute a managed application linked to a 64-bit native library a 64-bit VM is used. In such an arrangement, the VM translates the managed application bytecode to the ISA of the emulation layer (which is different than the current platform's ISA). Subsequently, the emulation layer translates the managed application bytecode to the ISA of the current platform. This double translation results in a decrease in performance when executing managed applications and is, thus, undesirable. This approach requires increased complexity due to the multiple required VMs and does not allow managed applications that link to two or more native libraries that are associated with different ISAs to be executed.

DETAILED DESCRIPTION

Figure 1:
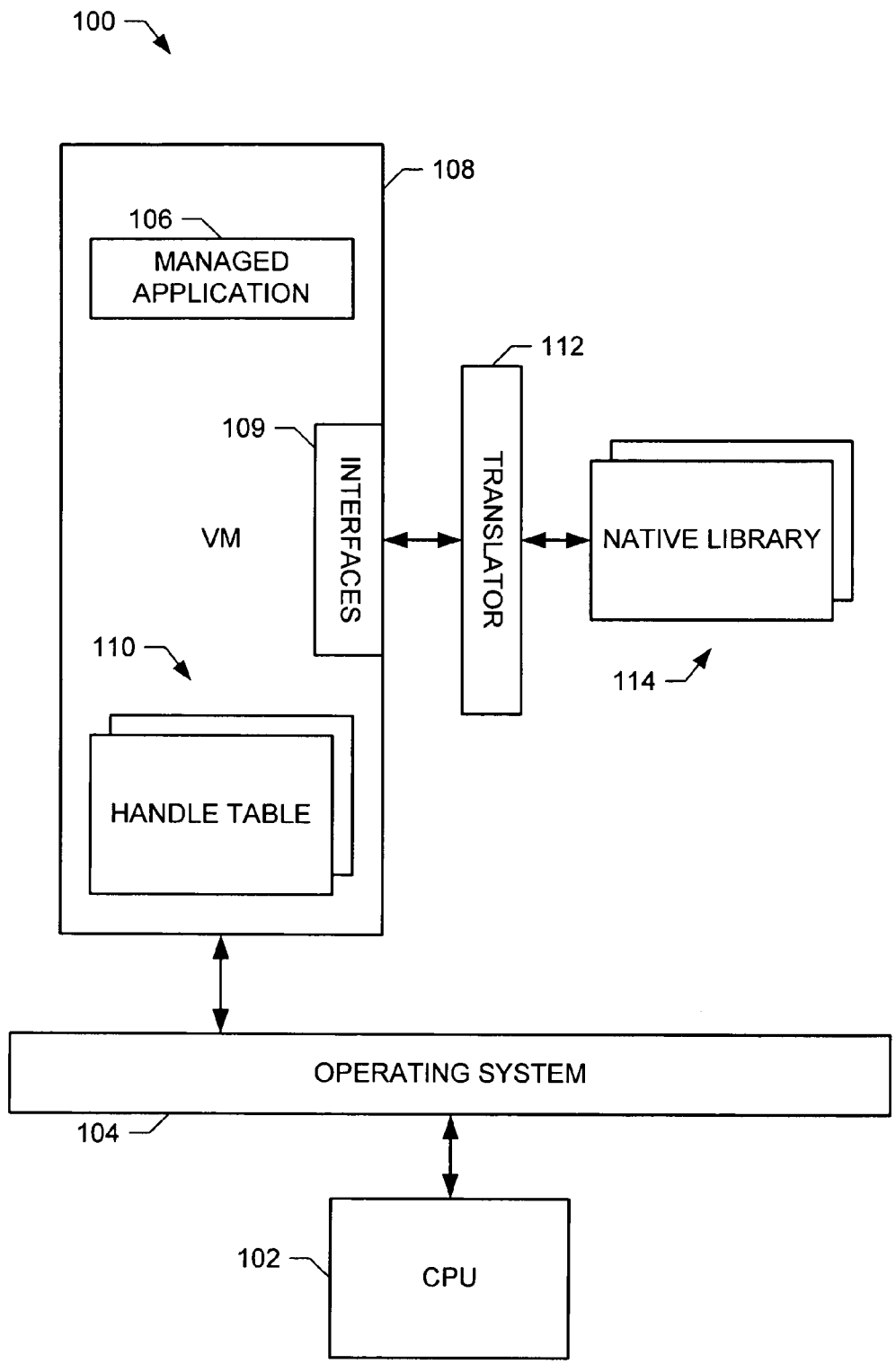
FIG. 1 is a block diagram of an example architecture that may be used to implement the disclosed methods and apparatus.
Figure 11:
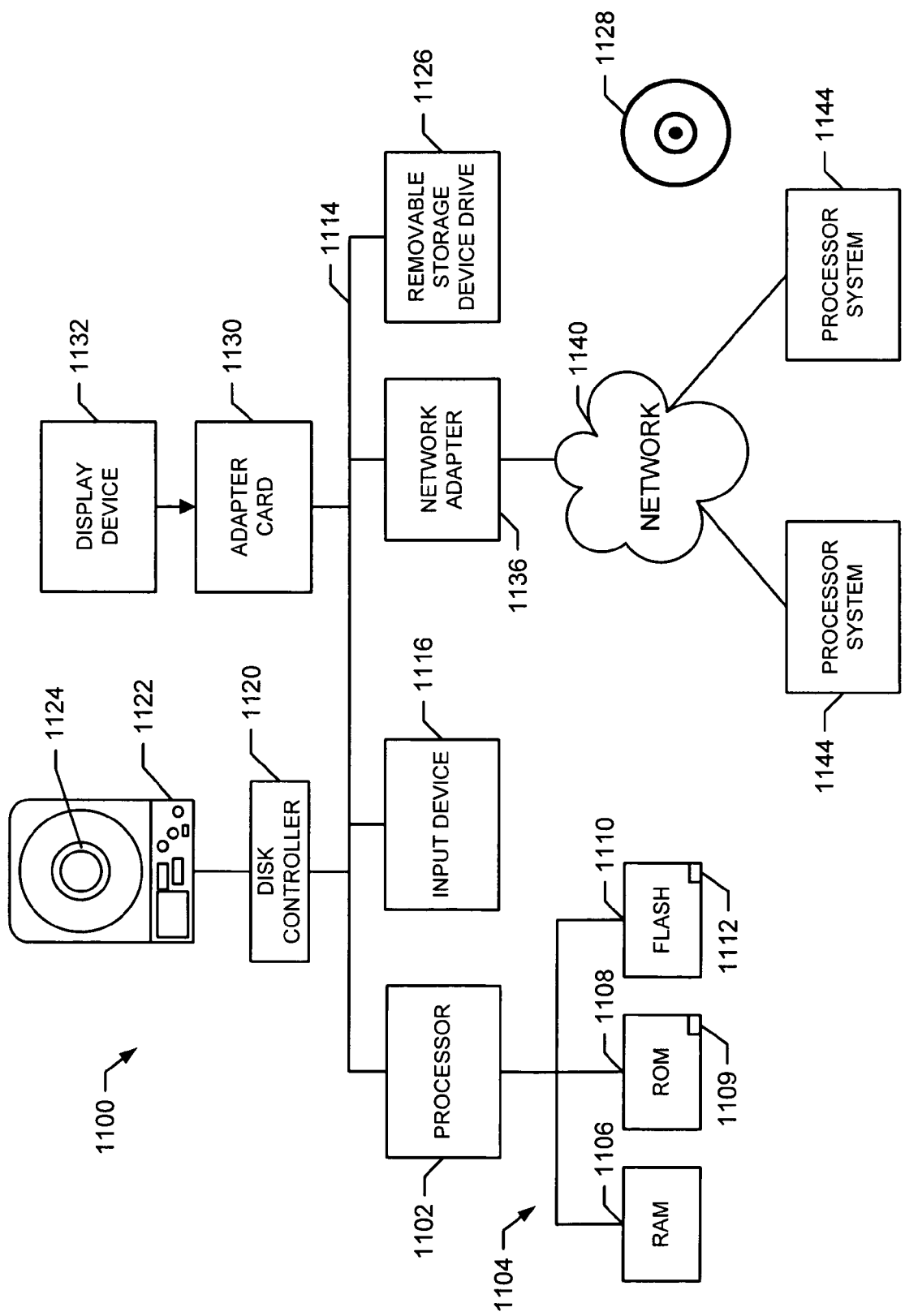
FIG. 11 is an example processor system that may be used to implement the systems and methods disclosed herein.

FIG. 1 is a block diagram of an example architecture 100 that may be used for implementing the proposed methods and apparatus. The example architecture 100 includes an operating system 104; a CPU 102; a managed application 106 that is executed within a virtual machine (VM) 108, which includes one or more interfaces 109, one or more handle table(s) 110; a translator 112; and one or more native libraries 114. The example architecture may be implemented as a part of a computer system that is shown in FIG. 11 and will be described in detail later.

The CPU 102 has an associated instruction set architecture (ISA) that defines the design of the CPU 102, such as the configuration of registers and the machine language that is implemented on the CPU 102. The CPU 102 is capable of executing machine language instructions that may be a part of a computer program. Example CPU ISAs are the Intel Itanium Architecture of the Intel Itanium Processor Family (IPF) and the Extended Memory Technology (EM64T) architecture. These are examples of 64-bit architectures. Another example CPU ISA is the 32-bit IA-32 architecture.

The operating system (OS) 104 is capable of controlling and allocating access to the hardware and software components in a computer system, such as the CPU 102. The OS 104 may manage the execution of the software applications by scheduling time on the processor, allowing access to memory components, and setting priority with other software applications. Example OSs 104 include Microsoft® Windows® XP, RedHat Linux, and BSD Unix.

The managed application 106 is a software application that may be written using a platform independent language such as, for example, Java™ or C#. However, any other platform independent computer language or instructions could be used instead. The managed application 106 may be stored on a memory within the example architecture 100 or may alternatively be stored on a remote architecture. The VM 108 statically compiles the managed application 106 to generate compiled code. The compiled code is intermediate language code or instructions (e.g., bytecodes in the case where the managed application 106 is written in Java™) that is stored in a binary format in a memory (not shown). The VM 108 generates compiled code that is compatible with the OS 104 and the CPU 102 so that portions of the code may be executed thereon. In other words, the compiled code is compatible with the ISA of the example architecture. The VM 108 also includes one or more interface(s) 109 that allow the VM 108 to initiate to the translator 112, which will be further described in detail herein. Example VMs 108 include the Java Virtual Machine (JVM) and the Microsoft®.NET Common Language Interpreter (CLI). Of course, any VM could be used to implement the VM 108.

The VM 108 may further include one or more handle table(s) 110. The handle table(s) 110 are capable of storing the memory locations of libraries and procedures. In particular, the handle table(s) 110 may store the mapping of the original location of a library or procedure to a translated version of that library or procedure. The handle table(s) 110 may be implemented in the memory allocated to the VM 108.

The native libraries 114 may be any libraries that are compiled into native code (machine language). The native libraries 114 may be written in a platform-dependent programming language such as C. The native library 114 may implement functions that are not available in the programming language of the managed application 106. The native libraries 114 are compiled to native code and therefore, cannot be executed on an architecture that does not implement the associated native code without translation. For example, a native library that is compiled to IA-32 native code cannot be executed on a 64-bit IPF platform.

The translator 112 is a software application that may translate machine language instructions of a compiled native library from one ISA to a different ISA. Specifically, the translator 112 is capable of translating the native libraries 114 to the ISA of the current platform. For example, the translator 112 may translate the IA-32 native library to 64-bit IPF machine language instructions. Further, the translator 112 is capable of mapping the location of procedure calls in the original machine language to the location of the translated procedure calls. The translator 112 may provide the mapping to the VM 108 so that it may store the location in the handle table(s) 110. The translator 112 may be implemented by way of a discrete software driver, a component of the operating system, or an embedded function of the CPU 102. An example of a translator 112 is the IA-32 Execution Layer (EL). The IA-32 EL is a software package from Intel for running IA-32 applications on IPF processors.

Figure 2:
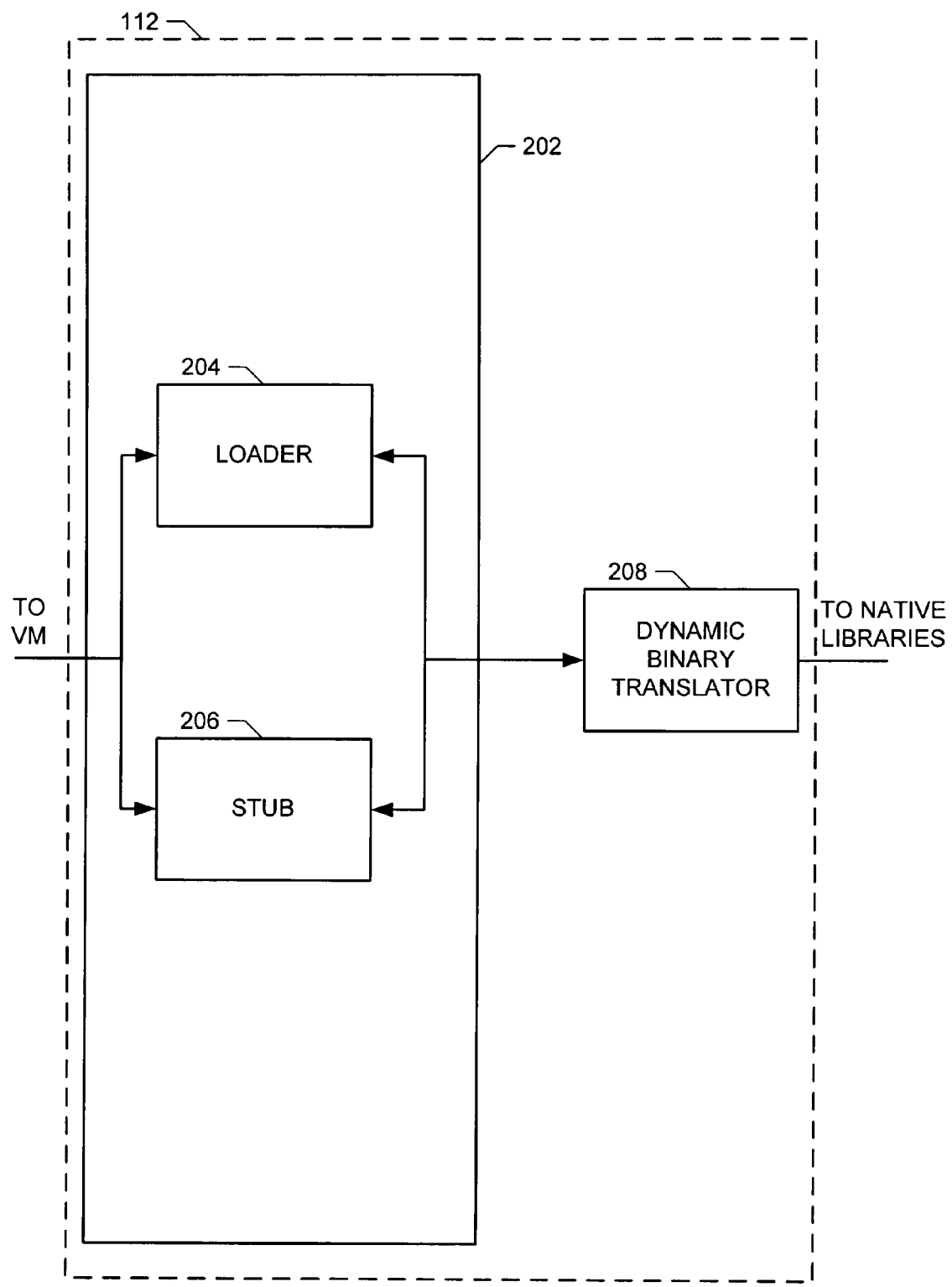
FIG. 2 is a block diagram of an example system for implementing the translator of FIG. 1.

FIG. 2 is a block diagram of one example implementation of the translator 112. The translator 112 may include an interface 202 and a dynamic binary translator 208. The interface 202 defines an application program interface (API) that enables communication between the VM 108 and the dynamic binary translator 208. In this example, the interface 202 includes a loader 204 and a stub 206. The interface 202 may replace a similar interface that is included with the VM 108 so that library loading and procedure calls may be redirected to the translator 112.

The loader 204 provides an interface for the VM 108 to call for the loading of one of the native libraries 114. The loader 204 is capable of redirecting a call to load one of the native libraries 114 to the dynamic binary translator 208. The loader 204 may further be capable of returning information about the one of the native libraries 114 to the VM 108.

The stub 206 provides an interface for the VM 108 to call one of the procedures in the one of the native libraries 114. The stub 206 is capable of redirecting a call to a procedure in the one of the native libraries 114 to the dynamic binary translator 208 for translation. The stub 206 may further be capable of passing returned values from the execution of the procedure to the VM 108.

The dynamic binary translator 208 is capable of translating native code from one ISA to another. The dynamic binary translator may additionally be capable of locating a procedure in a translated native code and returning the location of that procedure. One of ordinary skill in the art will recognize that a dynamic binary translator may be capable of translating native code from several ISAs or additionally that multiple dynamic binary translators may be provided in a system to support the execution of native libraries associated with several ISAs.

Figure 3:
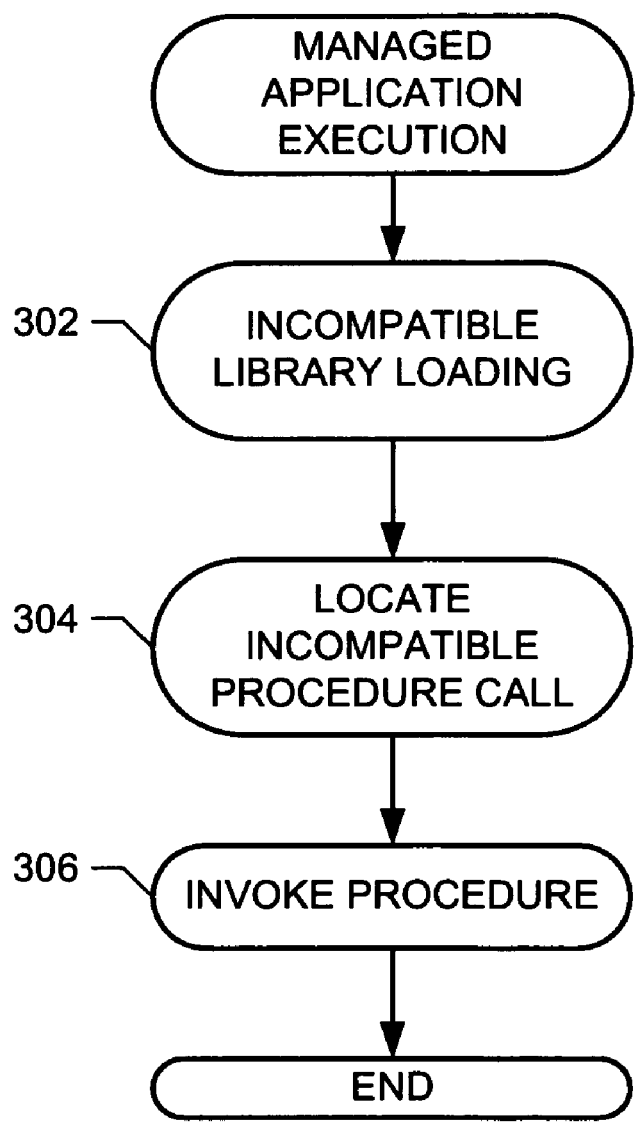
FIG. 3 is a flow diagram of an example process for executing a managed application that is linked to a native library.

FIG. 3 is a flowchart of an example process supporting the execution of a managed application 106 that includes calls to native libraries 114 that are of a different ISA than the ISA of the architecture 100. The method of FIG. 3 may take place during the execution of the managed application 106 in the VM 108. The example of FIG. 3 assumes that the managed application 106 includes a call to load one of the native libraries 114 followed by a call to one of the procedures in the one of the native libraries 114.

When the VM 108 attempts to load one of the native libraries 114 that is not supported by the architecture 100, the library will fail to load. The translator 112 can locate and load the one of the native libraries 114 with the dynamic binary translator 208 (block 302).

When the VM 108 attempts to locate a procedure in the one of the native libraries 114, the VM 108 will initially fail to locate the procedure because the call is to a procedure in a library that is not supported by the architecture 100 (block 302). The translator 112 locates the procedure in the one of the native libraries 114 that was loaded in block 302 and returns the location of the procedure (block 304). After the one of the native libraries 114 has been loaded and the procedure call has been located, the VM 108 can invoke the procedure using the translator 112 (block 306).

Figure 4:
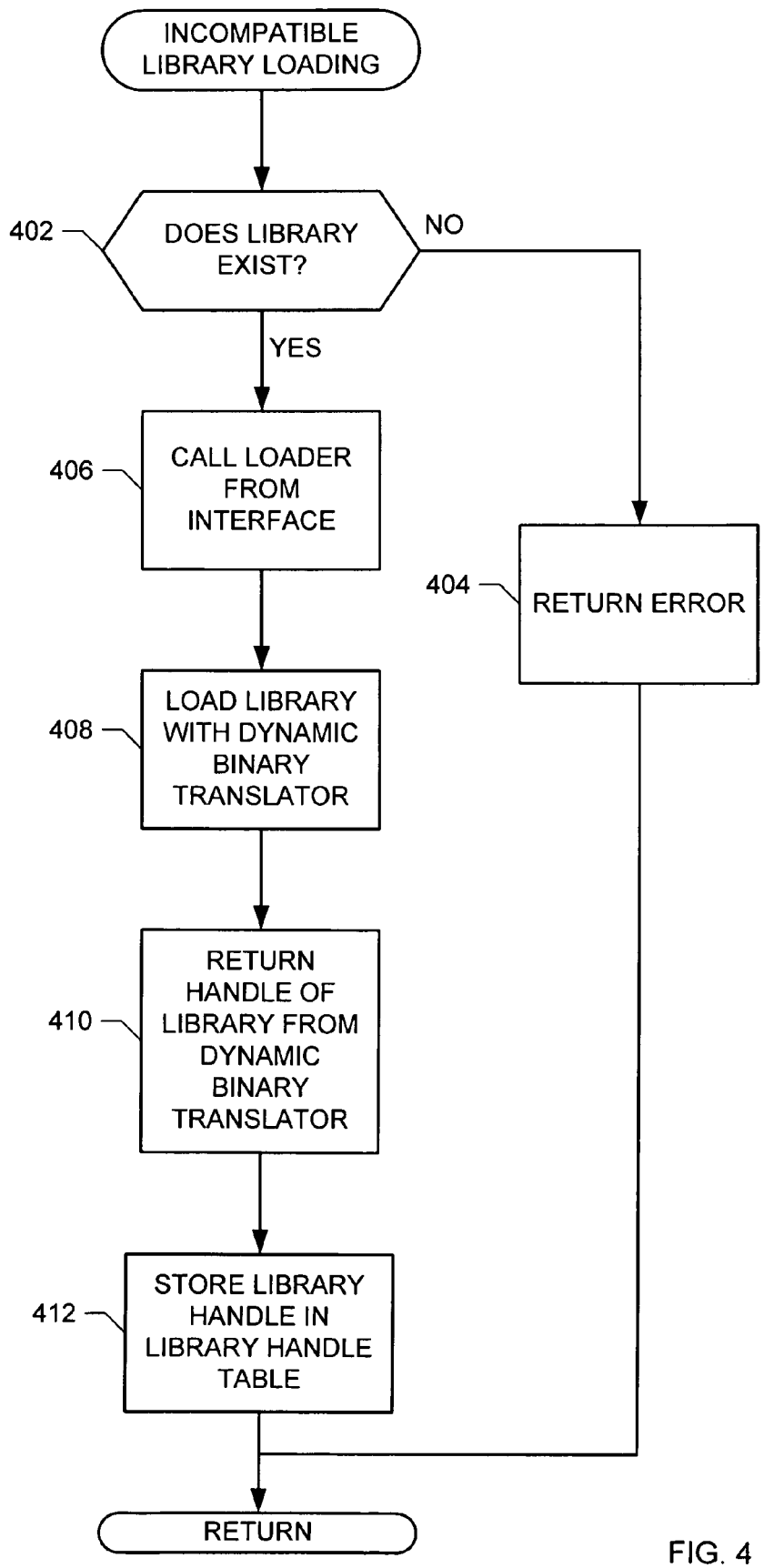
FIG. 4 is a flow diagram showing further detail of one example incompatible library loading process of FIG. 3.

FIG. 4 is a flowchart of a method for implementing the loading of an incompatible library of block 302. After the VM 108 fails to load the one of the native libraries 114, the VM 108 checks to determine if the one of the native libraries 114 exists (block 402). If the one of the native libraries 114 does not exist, an error is returned to indicate that the one of the native libraries 114 is missing (block 404). If the one of the native libraries 114 does exist, it is assumed that it could not be loaded because it is not supported by the architecture 100. The VM 108 then calls the loader 204 of the interface 202 to attempt to load the one of the native libraries 114 (block 406). The loader 204 directs the request to load the one of the native libraries 114 to the dynamic binary translator 208.

The dynamic binary translator 208 then loads the one of the native libraries 114 (block 408). The dynamic binary translator 208 passes the handle of the loaded one of the native libraries 114 to the VM 108 through the loader 204 (block 410). The VM 108 may then store the handle of the loaded one of the native libraries 114 in the one or more handle table(s) 110 (block 412). The VM then proceeds with loading and execution of the managed application 106.

Figure 5:
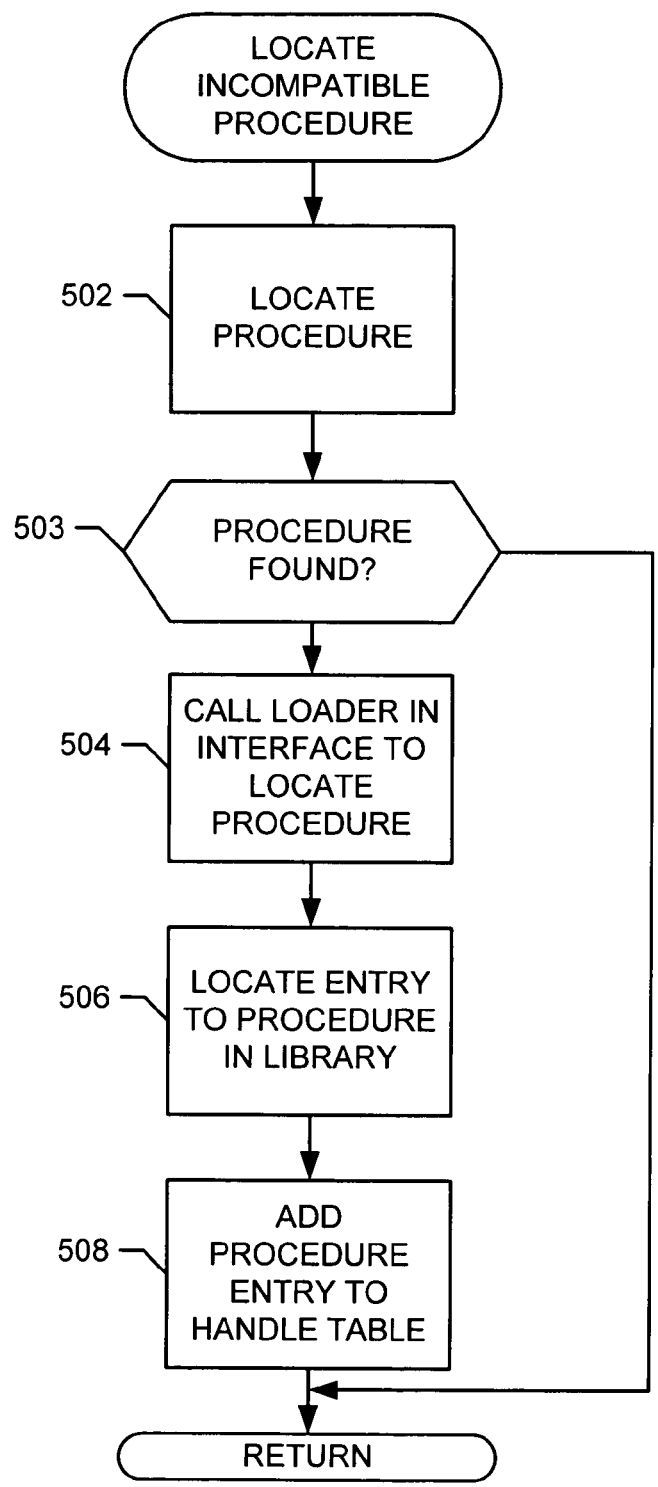
FIG. 5 is a flow diagram showing further detail of one example locate incompatible procedure call process of FIG. 3.

FIG. 5 is a flowchart of one example method for implementing the locate incompatible procedure call of block 304. The VM 108 will attempt to locate the procedure in the native library 114 (block 502). If the address of the procedure is found, the locate procedure method is complete. If the address of the procedure cannot be found the procedure is assumed to be associated with a ISA that is different than the ISA of the current platform (block 503). The VM 108 then calls the loader 204 of the interface 202 to attempt to locate the procedure in the one of the native libraries 114 (block 504). The VM 108 passes the handle of the translated one of the native libraries 114 to the loader 204. The loader 204 locates the procedure in the translated one of the native libraries 114 (block 506). The loader 204 returns the handle of the procedure in the translated one of the native libraries 114 to the VM 108. The VM 108 then stores the handle in the handle table(s) 110.

Figure 6:
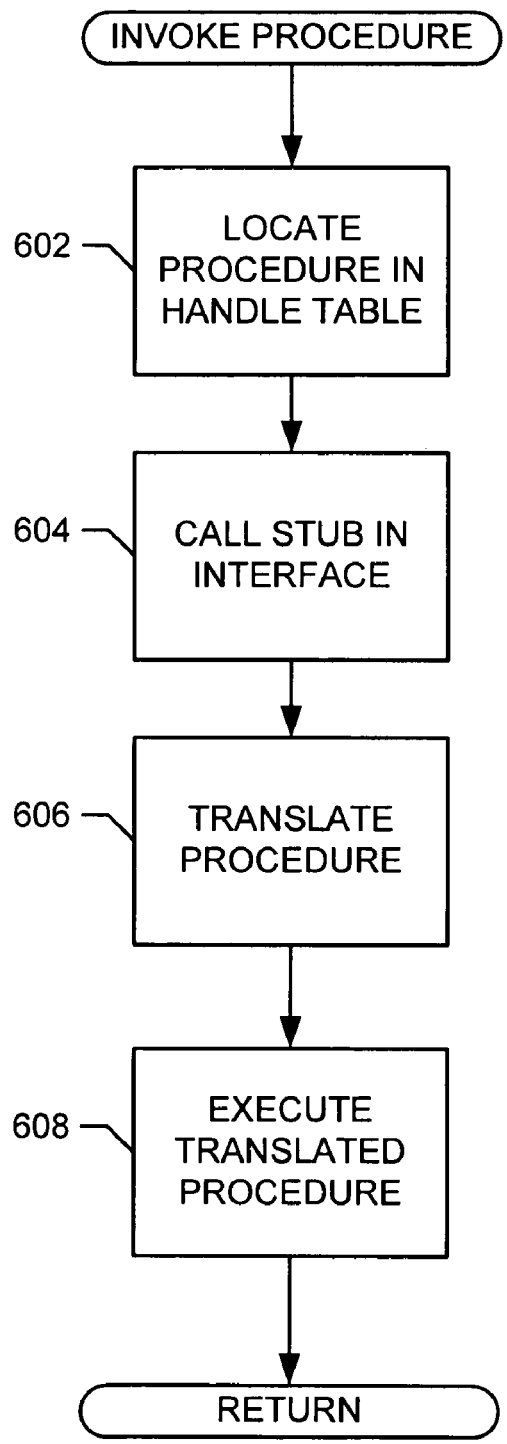
FIG. 6 is a flow diagram showing further detail of one example invoke procedure process of FIG. 3.

FIG. 6 is a flowchart of an example method for implementing the invoke procedure of block 306. The VM 108 first locates the handle for the procedure in the handle table(s) 110 (block 602). The VM 108 then calls the stub 206 in the interface 202 and passes the handle for the procedure and any other parameters that are associated with the procedure call (block 604). The stub prepares the VM for executing the procedure (e.g., generates a stack frame, context, etc.) and redirects the call to the dynamic binary translator 208. The dynamic binary translator 208 translates the procedure to the ISA of the architecture 100 (block 606). The dynamic binary translator 208 then executes the translated code on the CPU 102 via the operating system 104 (block 608). The procedure may return values, which are then passed back to the VM 108 via the stub 206. After the procedure finishes executing control is returned to the VM 108 and the next line of the managed application 106 may be executed.

Figure 7:
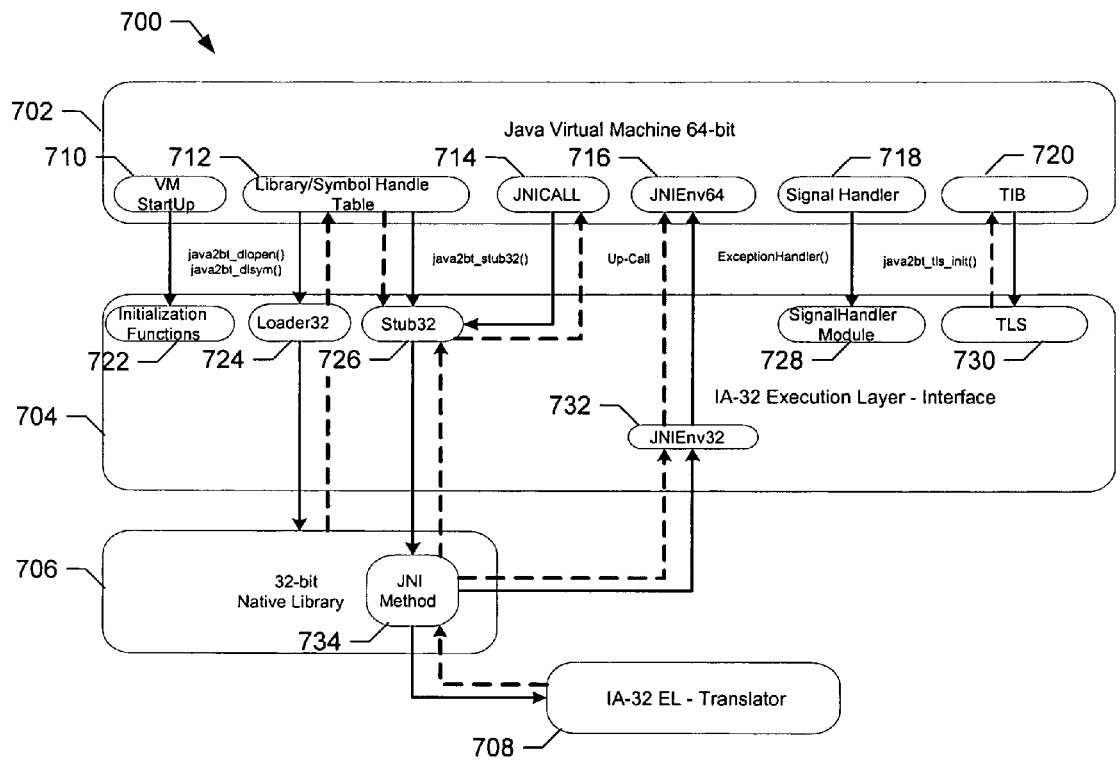
FIG. 7 is a block diagram of one example implementation of the disclosed systems and methods using a java virtual machine.

Turning now to FIG. 7, another example implementation of an architecture for executing a managed application that is linked with a native library that is not supported by the architecture is provided. The architecture 700 of FIG. 7 is an implementation for the Java™ programming language. The architecture 700 generally includes a 64-bit JVM 702, an IA-32 EL interface 704, 32-bit native library 706, and an IA-32 EL translator 708. These components may be substantially similar to the VM 108, the interface 202 of the translator 112, the one or more native libraries 114, and the dynamic binary translator 208 of the translator 112, respectively. FIG. 7 does not show a block for the managed application, operating system, and CPU that are a part of the overall architecture 700.

The 64-bit JVM 702 includes a VM Startup method 710 for startup and initialization of the 64-bit JVM. The VM Startup method 710 makes calls to initialization functions 722 of the IA-32 EL interface 704 to startup and initialize the IA-32 EL. The 64-bit JVM 702 further includes one or more library/symbol handle table(s) 712. The library/symbol handle table(s) 712 may be substantially similar to the handle table(s) 110 of FIG. 1. The 64-bit JVM 702 may make calls to the Loader32 method 724 to load libraries and locate procedures in loaded libraries. As shown in the figure, the procedure calls are java2bt_dlopen( ) and java2bt_dlsym( ) respectively. Loader32 returns the handles of the libraries and procedures to the Library/Symbol Handle Table(s) 712.

FIG. 7 includes one or more calls to a procedure in a native library shown as JNICall 714. If the procedure that is called by JNICall 714 is in a native library that is not supported by the platform, the JVM 702 must translate the call. The JVM 702 redirects the JNICall 714 from the actual procedure call to a call to the Stub32 method 726 using java2bt_stub32( ). The Stub32 method 726 retrieves the handle for the procedure from the library/symbol handle table(s) 712. The Stub32 method 726 then calls the JNI method 734 of the 32-bit native library 706 using the handle of the procedure. The JNI method 734 is translated and executed via the IA-32 EL translator 708. Any values returned from the JNI method 734 may be passed back to the JNICall 714 in the 64-bit JVM 702.

To enable the JNI method 734 to reference objects in the 64-bit JVM, the 64-bit JVM 702 includes JNIEnv64 716 and the IA-32 EL interface 704 includes the JNIEnv32 732. The JNIEnv32 732 is capable of intercepting calls to objects in the 64-bit JVM 702 by the JNI method 734 and translating the calls to reference the 64-bit objects. The JNIEnv32 732 then passes the calls to the JNIEnv64 716 via Up-Call. The JNIEnv32 732 is capable of handling object marshalling to convert 32-bit calls into 64-bit calls. One of ordinary skill in the art will recognize that values and calls may be passed back to the JNI method 734 via the JNIEnv64 716 and the JNIEnv32 732.

To handle any exceptions or errors that may occur, the 64-bit JVM 702 includes Signal Handler 718 and the IA-32EL includes Signal Handler Module 728. The Signal handler 718 and Signal Handler Module 728 can determine if an exception has occurred in the java code related to a managed application or in the code of a native library such as 32-bit native library 706 and handle the exception accordingly via the procedure ExceptionHandler( ).

The 64-bit JVM 702 includes a thread information block (TIB) 720 and the IA-32 EL interface 704 includes a thread local storage (TLS) 730. The TIB 720 and the TLS 730 support the emulation of threads and multi-threading for the managed application and the native library 706 respectively. Initializing a thread creates and initializes a segment of memory for execution a some set of instructions (e.g., instructions of a managed application). Using the interface method java2bt_init( ) the TIB 720 can signal to the TLS 730 to initialize a thread and process information can be transferred between the JVM 702 and the IA-32 EL interface 704.

Figure 8:
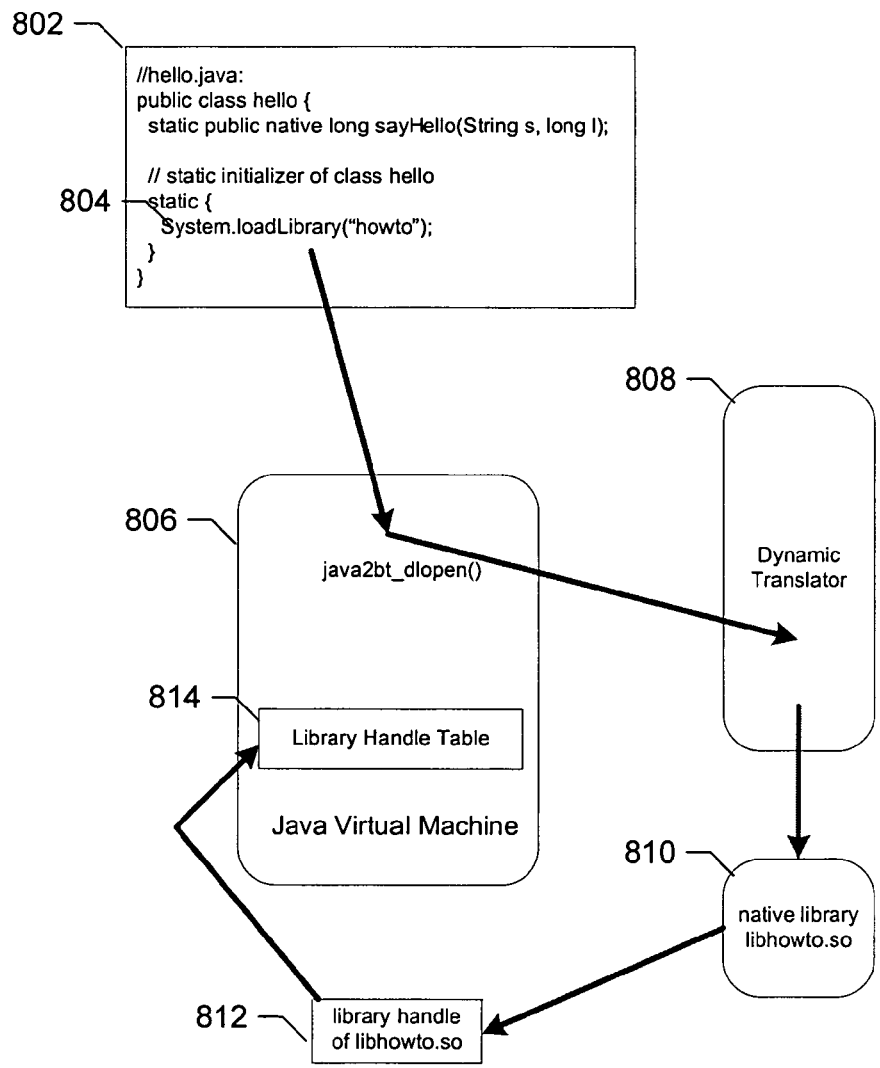
FIG. 8 is a block diagram of an example process of loading a library according to the implementation of FIG. 6.

FIG. 8 is a block diagram of a method for loading a native library in the architecture 700. The diagram includes managed application 802, which includes instruction 804 for loading the native library 810. When a JVM 806 reaches the instruction 804 the JVM 806 calls java2bt_dlopen( ), which attempts to load the native library 810 via a dynamic translator 808. The dynamic translator 808 may be substantially similar to the IA-32 EL translator 708 shown in FIG. 7. The dynamic translator 808 may then pass a handle for the library 812 to the JVM 806 for storage in the handle table 814.

Figure 9:
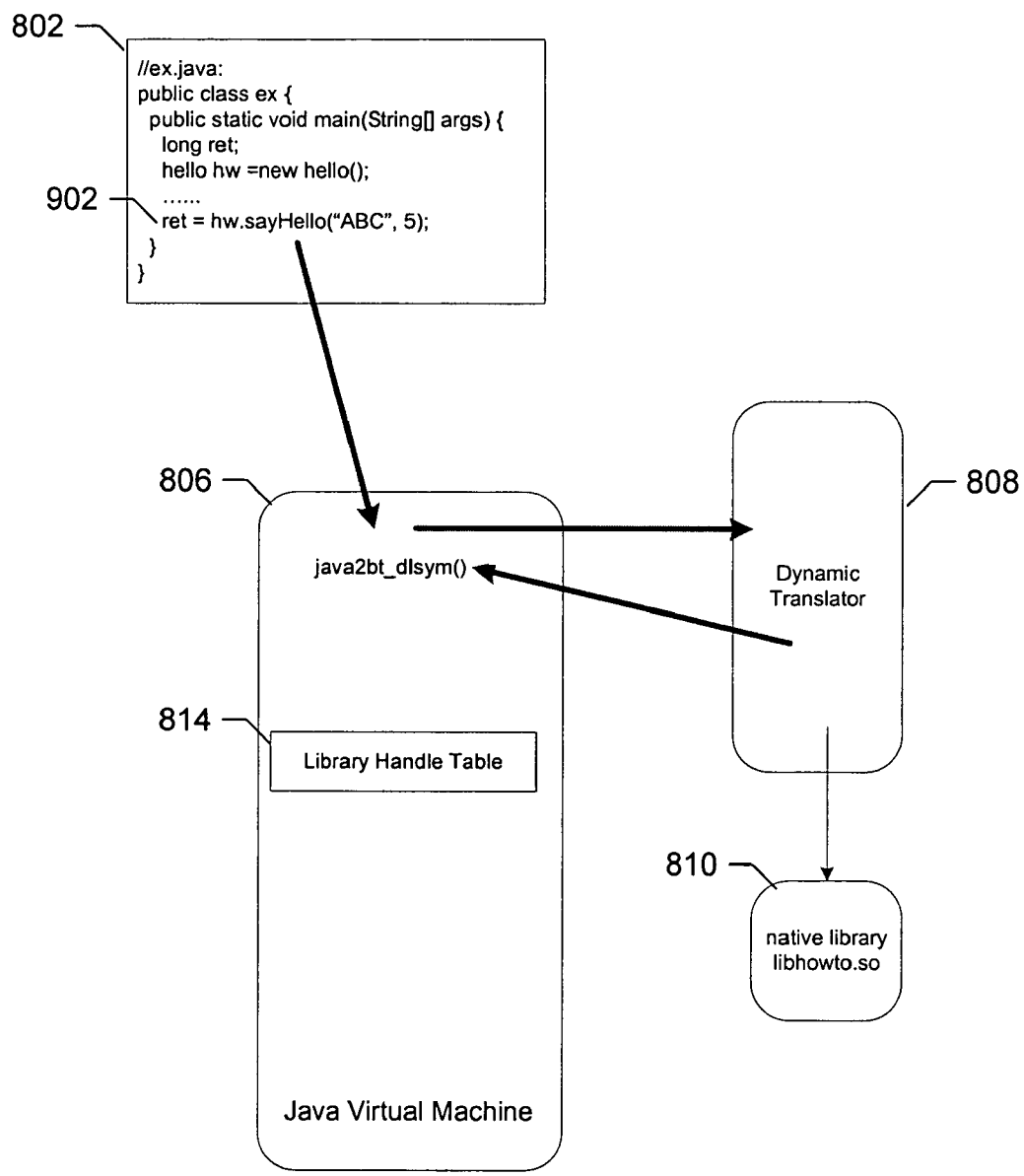
FIG. 9 is a block diagram of an example process for looking up a method in a native table according to the implementation of FIG. 6.

FIG. 9 is a block diagram of a method for locating a procedure in native library 810 in the architecture 700. When the JVM 806 reaches an instruction 902 for calling a procedure in native library 810 during execution of managed application 802, the JVM 806 calls java2bt_dlsym( ). This method directs the call to the dynamic translator 808 which locates the handle of the native library 810 that includes the procedure in the handle table 814 and then locates the procedure in the native library 810. The dynamic translator 808, then returns the handle of the procedure to the JVM 806 for storage in the handle table 814.

Figure 10:
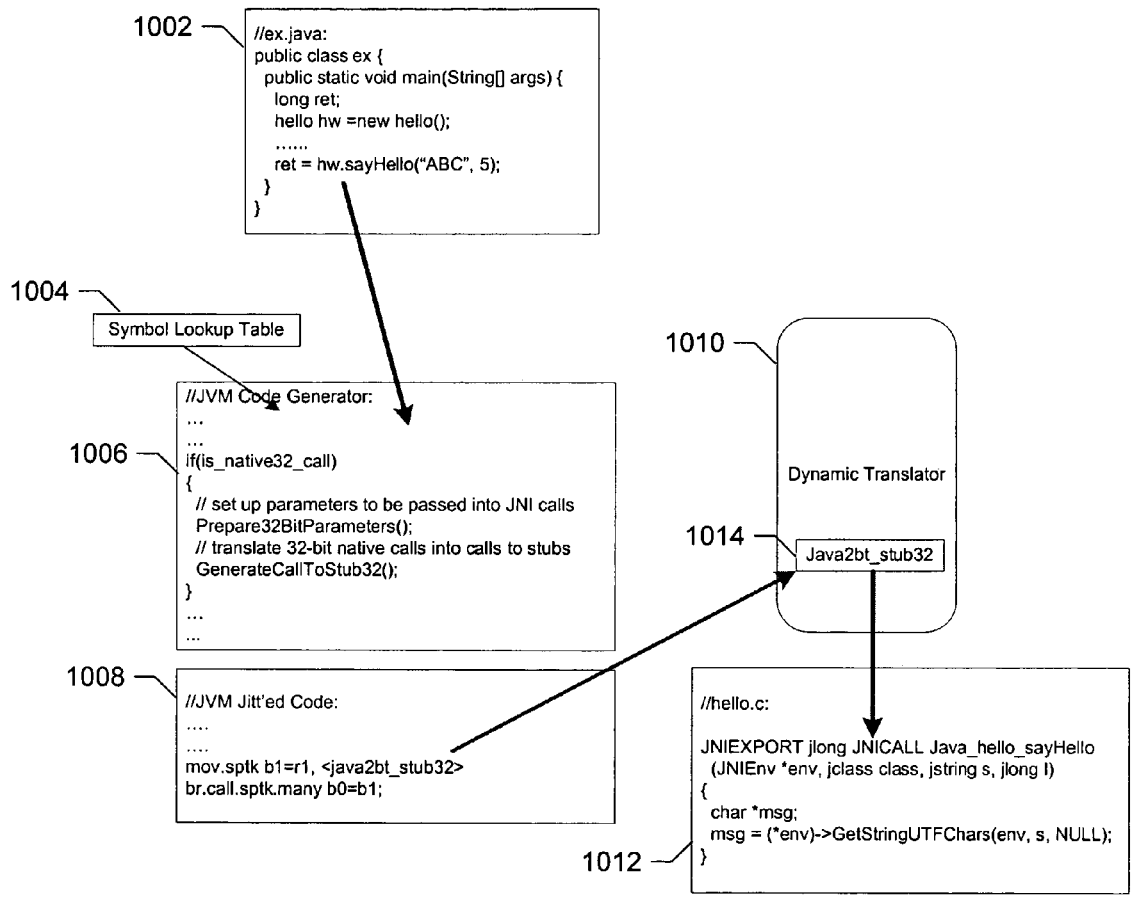
FIG. 10 is a block diagram of an example process for invoking a procedure in a native library according to the implementation of FIG. 6.

FIG. 10 is a block diagram of a process for invoking a procedure in the native library 810 in the architecture 700. FIG. 10 includes a portion of a Java™ application 1002, a symbol lookup table 1004, a portion of a JVM code generator 1006, a portion of generated code 1008, a dynamic translator 1010, a translated version of a native code procedure 1012. The portion of the JVM code generator 1006 executes on the portion of the Java application 1002. The JVM code generator 1006 includes the symbol lookup table 1004 that contains handles to native libraries and procedures. The JVM code generator 1006 generates the portion of generated code 1008 from the portion of the Java™ application 1002 replacing calls to native code that is not supported by the platform with calls to a stub function java2bt_stub32( ) 1014. The stub function java2bt_stub32( ) 1014 directs the procedure call to the translated version of the native code procedure 1012 generated by the dynamic binary translator 1010. The translated version of the native code procedure 1012 is then executed by the platform.

In general, the portion of the Java™ application 1002 includes an instruction that references the native code procedure 1012. When executing the portion of the Java application 1002 generates the machine code of the generated code 1008 using the JVM code generator 1006. The JVM code generator 1006 replaces the reference to the native code 1012 with a call to the stub function java2bt_stub32( ) 1014. Then generated code is then executed. Once the call to the stub function java2bt_stub32( ) is reached during execution, the stub function java2bt_stub32( ) directs the reference to the native code procedure 1012 to the dynamic translator 1010. The dynamic translator 1010 translates the native code procedure 1012 to machine code that is compatible with the platform. The translated native code procedure is then executed.

Turning now to FIG. 11, an example processor system 1100 includes a processor 1102, having associated system memory 1104. The processor 1102 may be substantially similar to the CPU 112 of FIG. 1. The system memory 1104 may include one or more of a random access memory (RAM) 1106, a read only memory (ROM) 1108 and a flash memory 1110. The ROM 1108 and the flash memory 1110 of the illustrated example may respectively include boot blocks 1109 and 1112.

The processor 1102, in the example of FIG. 11, is coupled to an interface, such as a bus 1114 to which other peripherals or devices are interfaced. In the illustrated example, the peripherals interfaced to the bus 1114 include an input device 1116, a disk controller 1120 communicatively coupled to a mass storage device 1122 (i.e., hard disk drive) having a host protected area 1124, and a removable storage device drive 1126. The removable storage device drive 1126 may include associated removable storage media 1128, such as magnetic or optical media.

The example processor system 1100 of FIG. 11 also includes an adapter card 1130, which is a peripheral coupled to the bus 1114 and further coupled to a display device 1132.

The example processor system 1100 may be, for example, a conventional desktop personal computer, a notebook computer, a workstation or any other computing device. The processor 1102 may be any type of processing unit, such as a microprocessor from the Intel® Pentium® family of microprocessors, the Intel® Itanium® family of microprocessors, and/or the Intel XScale®. family of processors.

The memories 1106, 1108, and 1110, which form some or all of the system memory 1104, may be any suitable memory devices and may be sized to fit the storage demands of the system 1100. The ROM 1108, the flash memory 1110, and the mass storage device 1122 are non-volatile memories. Additionally, the mass storage device 1122 may be, for example, any magnetic or optical media that is readable by the processor 1102.

The input device 1116 may be implemented by a keyboard, a mouse, a touch screen, a track pad or any other device that enables a user to provide information to the processor 1102.

The display device 1132 may be, for example, a liquid crystal display (LCD) monitor, a cathode ray tube (CRT) monitor, or any other suitable device that acts as an interface between the processor 1102 and a user via the adapter card 1130. The adapter card 1130 is any device used to interface the display device 1132 to the bus 1114. Such cards are presently commercially available from, for example, Creative Labs and other like vendors.

The removable storage device drive 1126 may be, for example, an optical drive, such as a compact disk-recordable (CD-R) drive, a compact disk-rewritable (CD-RW) drive, a digital versatile disk (DVD) drive or any other optical drive. It may alternatively be, for example, a magnetic media drive. The removable storage media 1128 is complimentary to the removable storage device drive 1126, inasmuch as the media 1128 is selected to operate with the drive 1126. For example, if the removable storage device drive 1126 is an optical drive, the removable storage media 1128 may be a CD-R disk, a CD-RW disk, a DVD disk or any other suitable optical disk. On the other hand, if the removable storage device drive 1126 is a magnetic media device, the removable storage media 1128 may be, for example, a diskette, or any other suitable magnetic storage media.

The example processor system 1100 also includes a network adapter 1136 (i.e., a processor peripheral), such as, for example, an Ethernet card or any other card that may be wired or wireless. The network adapter 1136 provides network connectivity between the processor 1102 and a network 1140, which may be a local area network (LAN), a wide area network (WAN), the Internet, or any other suitable network. As shown in FIG. 11, further processor systems 1144 may be coupled to the network 1140, thereby providing for information exchange between the processor 1102 and the processors of the processor systems 1144.

Of course, one of ordinary skill in the art will recognize that the order, size, and proportions of the memory illustrated in the example systems may vary. For example, the user/hardware variable space may be sufficiently larger than the main firmware instructions space. Additionally, although the forgoing discloses example systems including, among other components, software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the following describes example systems, persons of ordinary skill in the art will readily appreciate that the examples are not the only way to implement such systems.

What is claimed is:

1. A method for executing a managed application comprising:

executing the managed application with a virtual machine associated with a first ISA;

loading a native library or application associated with a second ISA that is different than the first ISA;

trapping a first call to a procedure from the managed application to the native library or application, the procedure being associated with the second ISA;

translating the procedure into a translated version of the procedure, the translated version of the procedure being associated with the first ISA;

directing the first call to the translated version of the procedure;

intercepting a second call from the translated version of the procedure to an object associated with the managed application within the virtual machine;

translating the second call into a translated second call having a format compatible with the first ISA;

passing the translated second call to the object;

passing a value from the object to the translated version of the procedure in response to the translated second call; and returning a value from the translated version of the procedure to the managed application via an intervening stub.

2. A method as defined in claim 1 wherein loading the native library or application comprises:

storing a handle that points to the loaded native library or application in a list of handles.

3. A method as defined in claim 2 wherein trapping the first call to the procedure comprises:

retrieving the handle associated with the library that contains the procedure from the list of handles;

locating an address of the translated version of the procedure; and storing the address of the translated version of the procedure.

4. A method as defined in claim 3 wherein the first call is redirected to a stub function that directs the first call to the translated version of the procedure.

5. A method as defined in claim 1 wherein the application is at least one of a Java™ application or a Microsoft.NET Common Language application.

6. A method according to claim 1 further comprising:
   determining if the native library or application exists; and
   if the library does not exist, returning an error message.

7. An article of manufacture storing machine readable instructions that, when executed, cause a machine to:

execute a managed application with a virtual machine associated with a first ISA;

load a native library or application associated with a second ISA that is different than the first ISA;

trap a first call to a procedure from the managed application to the native library or application, the procedure being associated with the second ISA;

translate the procedure into a translated version of the procedure, the translated version of the procedure being associated with the first ISA;

direct the first call to the translated version of the procedure;

intercept a second call from the translated version of the procedure to an object associated with the first ISA in the virtual machine;

translate the second call into a translated second call having a format compatible with the first ISA:

pass the translated second call to the object within the virtual machine; and pass a value from the object to the translated version of the procedure in response to the translated second call returning a value from the translated version of the procedure to the managed application via an intervening stub.

8. An article of manufacture as defined in claim 7 wherein the machine readable instructions further cause the machine to:

store a handle that points to the loaded native library or application in a list of handles.

9. An article of manufacture as defined in claim 8 wherein the machine readable instructions further cause the machine to:

retrieve the handle associated with the library that contains the procedure from the list of handles;

locate an address of the translated version of the procedure; and store the address of the translated version of the procedure.

10. An article of manufacture as defined in claim 9 wherein the machine readable instructions further cause the machine to redirect the first call to a stub function that directs the first call to the translated version of the procedure.

11. An article of manufacture as defined in claim 7 wherein the application is at least one of a Java™ application or a Microsoft.NET Common Language application.

12. An article of manufacture as defined in claim 7 wherein the machine readable instruction further cause the machine to:

determine if the native library or application exists; and
   if the native library or application does not exist, return an error message.

* * * * *